No. 867,108. PATENTED SEPT. 24, 1907.
J. R. CARMER.
HOSE TERMINAL.
APPLICATION FILED OCT. 1, 1906.
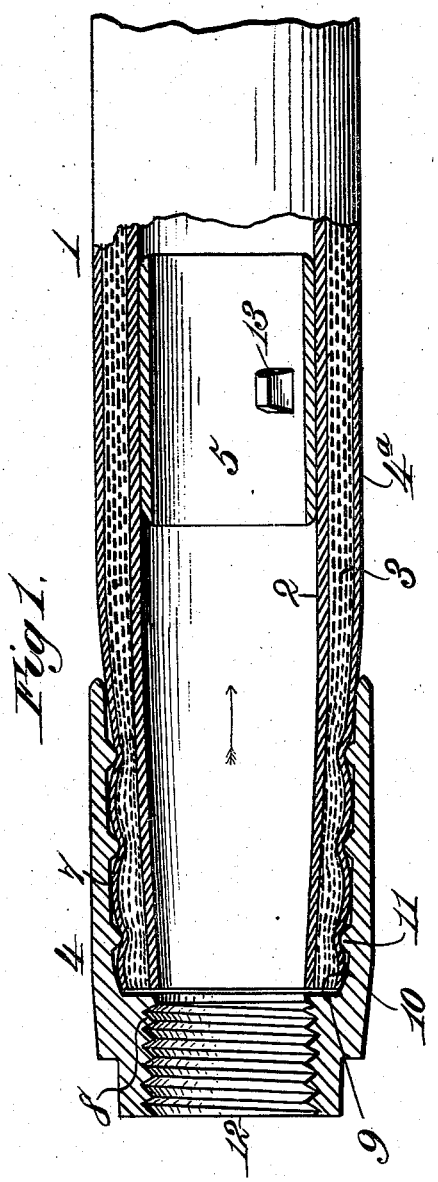
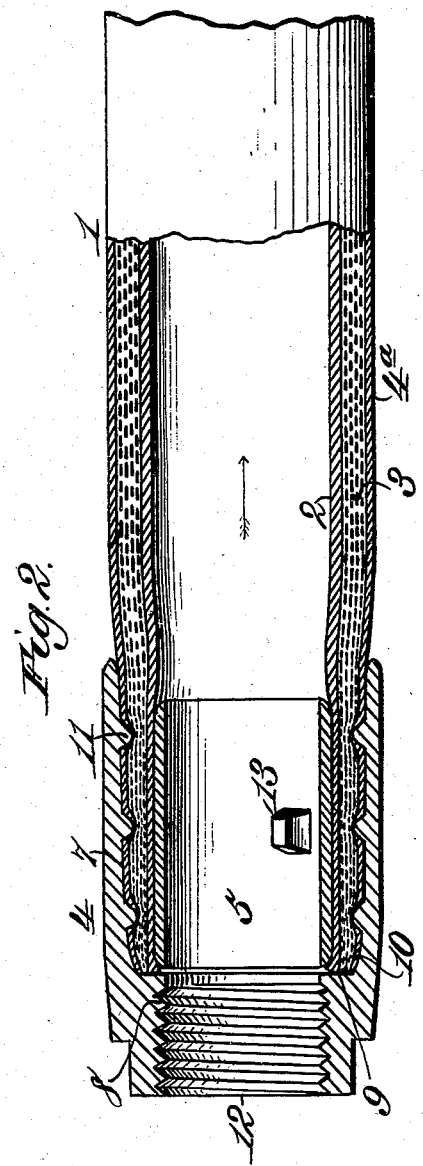
Witnesses.
Inventor:
James R. Carmer.
By James L. Norris.
Atty.

UNITED STATES PATENT OFFICE.

JAMES R. CARMER, OF WASHINGTON, DISTRICT OF COLUMBIA.

HOSE-TERMINAL.

No. 867,108.        Specification of Letters Patent.        Patented Sept. 24, 1907.

Application filed October 1, 1906. Serial No. 337,002.

*To all whom it may concern:*

Be it known that I, JAMES R. CARMER, a citizen of the United States, residing at Washington, in the District of Columbia, have invented new and useful Improvements in Hose-Terminals, of which the following is a specification.

This invention relates to hose terminals, and is particularly adapted for reinforcing and protecting the ends of a hose member of a train pipe coupling, and the object thereof is to provide a hose terminal so constructed and arranged as to protect the inner surface of the hose at the ends thereof against injury; to provide a hose terminal, which, when the hose becomes damaged, can be readily removed and used again, and thereby effect a considerable saving of expense in brake equipment for cars; to provide a hose terminal which is so constructed and arranged that the inner diameter of that end of the hose to which the terminal is attached will be of a diameter substantially equal to the inner diameter of the remaining portion of the hose to permit passage of fluid through the terminal as it enters the hose, and to provide a hose terminal, which, when set up, will not mar or strip the inner lining of the hose.

A further object of the invention is to provide a terminal whereby the edge of that end of the hose to which the terminal is attached is protected against fraying by a sudden incoming supply of fluid therethrough.

Other objects of the invention are to provide a hose terminal which will be simple in construction, easily positioned with respect to the end of the hose, durable, efficient in its use, strong, and comparatively inexpensive to manufacture.

With the foregoing and other objects in view, the invention consists of the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In describing the invention in detail reference is had to the accompanying drawings, wherein like reference characters denote corresponding parts throughout the several views, and in which—

Figure 1 is a sectional view of a hose member showing the parts of the hose terminal in the act of assembling, and, Fig. 2 is a like view showing the parts assembled.

Referring to the drawings by reference characters, 1 denotes the hose member, which is formed of an inner lining 2, an intermediate portion 3 and a covering 4. In connection with the hose member 1 it will be stated that generally the inner lining, as well as the outer covering is of rubber, but the inner lining is formed of a much better quality of rubber than the outer covering. In some instances the outer covering is of fabric. The intermediate portion is generally of canvas. It is the more expensive inner lining which it is desired to protect against injury, since if the inner lining is punctured or otherwise injured the air or other fluid will escape therethrough and through the intermediate portion and outer covering.

A hose terminal in accordance with this invention comprises an outer section 4 and an inner section 5, between which the end of the hose member is compressed. The outer section 4 is cylindrical in contour and has its inner surface formed of two different diameters. That portion of larger diameter which is indicated by the reference character 7 is of greater length than the portion of smaller diameter, which is indicated by the reference character 8. The portion 7 slightly tapers towards the portion 8 and the latter has its diameter substantially equal to the inner diameter of the hose member. By forming the inner surface of the section 4 of two different diameters a shoulder 9 is provided, which acts as a shield for the edge 10 of the hose member to prevent the incoming fluid from engaging the edge 10 of the hose to prevent stripping the latter. The direction in which the air travels is indicated by the arrow. The portion 7 of the inner surface of the section 4 is provided with a plurality of annular ribs 11, which in connection with the inner section 5 and when the section 4 is in position, are adapted to tightly compress the outer lining of the hose member against the canvas portion and prevent the section 4 from being pulled off the hose member 1. When the hose member is secured between the sections, the end of the hose member is compressed in a wedge-like manner. Projecting from the outer end of the section 4 is a screw-threaded nipple 12. The nipple may be interiorly or exteriorly screw-threaded, and as shown, is interiorly threaded. The function of the nipple 12 is to connect the terminal with the angle cock of the train pipe or with means for connecting the terminal to the angle cock or with the coupling between the two hose members.

The inner section 5 of the terminal consists of a non-expansible cylindrical bushing of the same external diameter throughout its length, but of a slightly larger diameter than the inner diameter of the hose member 1. The section 5 is of sufficient length to extend from the shoulder 9 to near the inner end of the section 4 to permit the hose to bend at the end of the section 4 without possibility of injury to its inner surface by coming into contact with the inner end of the section 5. A pair of lugs 13 are formed on the inner surface of the section 5 to permit of a tool shifting the said section 5 to operative position with respect to the section 4.

The end of the hose member to which the terminal is attached is compressed between the sections 4 and 5, and when the terminal is in position, the inner surface of the section 5 is flush with the inner surface of the portion 8 of the section 4, and said section 5 has its outer edge in close proximity to the shoulder 9.

When assembling the terminal on the end of a hose the section 5 is first slipped within the end of the hose some distance beyond the end of the hose, as shown in Fig. 1, said section 5, as before stated, having an exterior diameter slightly larger than the interior diameter of the hose; the section 4 is then positioned upon the exterior of the hose at the end thereof; the section 5 is then pulled towards the shoulder 9 by means of a suitable implement, and the hose member is thereby firmly compressed and clamped between the sections 4 and 5. When the section 5 is drawn towards the shoulder 9 there is no flaring outwardly of the end of the hose upon which the terminal is mounted. The hose is simply compressed between the two sections. Owing to the fact that the outer surface of the section 5 is smooth, there is no liability of stripping or injuring the inner lining of the hose member 1, and since the edge 10 of the hose member is protected by the shoulder 9 and also protected by the forward end of the section 5, said edge 10 is protected against fraying by a sudden incoming supply of fluid.

What I claim is—

1. A terminal for a hose member of a train pipe coupling to prevent the stripping of the member by the incoming air, consisting of an outer cylindrical section having its inner surface of two different diameters to form a shoulder, the portion of smaller diameter being substantially equal to the inner diameter of the hose member and through which the air enters the hose member, the portion of larger diameter slightly tapering towards the free end of said section and having a plurality of ribs adapted to engage in the periphery of the hose member when the said section is in operative position, said shoulder adapted to abut against the edge of the hose member when the said section is in position, and an inner annular non-expansible section having its outer diameter greater than the inner diameter of the hose member and adapted to compress the hose member in a wedge-like manner between it and said outer section, said inner section extending from the shoulder of the outer section to near the inner end of said outer section, and having its inner diameter the same as that portion of smaller diameter of the outer section.

2. A terminal for a hose member of a train pipe coupling to prevent the stripping of the member by the incoming air from a source of supply, consisting of an outer cylindrical section having its inner surface of two different diameters to form a shoulder, the outer diameter of the major portion of said section being substantially equal to the outer diameter of the hose member, that portion of smaller diameter of the inner surface of said section being substantially equal to the inner diameter of the hose member and that portion of larger diameter of the inner surface of said section formed with a plurality of ribs adapted to engage in the periphery of the hose member when the said section is in its operative position, said shoulder adapted to abut against the edge of the hose member when the said section is in position, thereby preventing the stripping of the end of the hose member by the incoming air, and an inner non-expansible annular section having its outer diameter greater than the inner diameter of the hose member and adapted to compress the hose member between it and said outer section, said inner section extending from the shoulder of the outer section to near the end of said outer section to permit of the hose to bend at the end of the outer section without possibility of injury to its inner surface by coming in contact with the inner end of the inner section.

In testimony whereof I have hereunto set my hand in presence of two subscribing witnesses.

JAMES R. CARMER.

Witnesses:
N. L. BOGAN,
CHAS. S. HYER.